(12) United States Patent
Chandrappa et al.

(10) Patent No.: US 11,252,096 B2
(45) Date of Patent: Feb. 15, 2022

(54) NETWORK FLOW STATE MANAGEMENT FOR CONNECTIONLESS PROTOCOL(S)

(71) Applicant: Microsoft Technology Licensing, LLC, Redmond, WA (US)

(72) Inventors: Harish Kumar Chandrappa, Bothell, WA (US); Milan Dasgupta, Seattle, WA (US); Daniel Max Firestone, Seattle, WA (US); Adarsh Kirnelli Rangaiah, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/447,833

(22) Filed: Jun. 20, 2019

(65) Prior Publication Data

US 2020/0403926 A1    Dec. 24, 2020

(51) Int. Cl.
*H04L 12/801* (2013.01)
*H04L 12/825* (2013.01)
*H04L 12/841* (2013.01)
*G06F 16/22* (2019.01)
*G06F 9/455* (2018.01)

(52) U.S. Cl.
CPC .......... *H04L 47/25* (2013.01); *G06F 9/45558* (2013.01); *G06F 16/2255* (2019.01); *H04L 47/286* (2013.01); *H04L 47/29* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 8,159,943 B2 * | 4/2012 | Garcia | H04L 45/34 370/231 |
| 8,767,551 B2 | 7/2014 | Goldfarb et al. | |
| 9,306,794 B2 | 4/2016 | Kirshnan et al. | |
| (Continued) | | | |

OTHER PUBLICATIONS

Fattah, et al., "U.S. Appl. No. 16/103,790", filed Aug. 14, 2018, 51 Pages.

(Continued)

*Primary Examiner* — Willie J Daniel, Jr.
(74) *Attorney, Agent, or Firm* — Newport IP, LLC; Han Gim (57) ABSTRACT

Described herein is a system and method for managing network flow state for ongoing flows (connectionless protocol flows and connection-based protocol flows) between client device(s) and a virtual machine using a flow collection data structure (e.g. hash table) having a predefined maximum quantity of ongoing flows that can be managed. When it is determined that the flow collection data structure is managing greater than an acceptable threshold of connectionless protocol flows, at a dynamically adjustable frequency, flow state for more connectionless protocol flow(s) having an unexpired time-to-live are expired. The frequency can be adjusted based upon a rate at which new flows are being created and/or a rate at which flows are being deleted. Also described herein is a system and method in which, at a particular frequency, only a portion of the flows in the flow collection data structure are evaluated in order to minimize impact on packet processing.

20 Claims, 5 Drawing Sheets

(56) References Cited

U.S. PATENT DOCUMENTS

| | | |
|---|---|---|
| 9,384,112 B2 * | 7/2016 | Petersen ............... G06F 11/327 |
| 10,541,926 B2 * | 1/2020 | Singh .................... H04L 69/321 |
| 2012/0173712 A1 * | 7/2012 | Ma ........................ H04L 69/164 |
| | | 709/224 |
| 2014/0146674 A1 | 5/2014 | Wang et al. |
| 2016/0080280 A1 * | 3/2016 | Ramachandran ... H04L 43/0817 |
| | | 370/235 |
| 2016/0241459 A1 | 8/2016 | Zheng et al. |
| 2016/0241485 A1 | 8/2016 | Ahn et al. |
| 2017/0063689 A1 | 3/2017 | Qin |
| 2018/0191471 A1 | 7/2018 | Elhaddad et al. |
| 2018/0262556 A1 | 9/2018 | Firestone |
| 2018/0375762 A1 | 12/2018 | Bansal et al. |

OTHER PUBLICATIONS

Firestone, Daniel, "VFP: A Virtual Switch Platform for Host SDN in the Public Cloud", In Proceedings of 14th USENIX Symposium on Networked Systems Design and Implementation, Mar. 27, 2017, pp. 315-328.

* cited by examiner

NETWORK FLOW STATE MANAGEMENT FOR CONNECTIONLESS PROTOCOL(S)

BACKGROUND

Cloud-based networks allow computer processing and storing needs to be moved from on premises networks to hybrid cloud or fully cloud-based networks while satisfying data security access requirements. A cloud-based network may include physical machines (PMs) and virtual machines (VMs). Cloud applications may be implemented via the PMs and/or the VMs. The cloud applications can be accessed from client stations of organizations at remote locations.

SUMMARY

Described herein is a system for managing network flow state, comprising: a computer comprising a processor and a memory having computer-executable instructions stored thereupon which, when executed by the processor, cause the computer to: manage flow state for each of a plurality of ongoing flows between one or more client devices and a virtual machine, wherein information regarding the flow state is stored in a flow collection data structure having a predefined maximum quantity of ongoing flows that can be managed, wherein the plurality of ongoing flows comprises connection-based protocol flows, and, connectionless protocol flows, each flow having an associated time-to-live; and when it is determined that the flow collection data structure is managing greater than a threshold quantity of connectionless protocol flows (e.g., beyond an acceptable threshold), at a dynamically adjustable frequency, expire flow state for one or more connectionless protocol flows having an unexpired time-to-live (e.g., sooner than the default or full time-to-live).

Also described herein is a method of performing network flow management for connectionless protocol(s), comprising: managing flow state for each of a plurality of ongoing flows between one or more client devices and a virtual machine, wherein information regarding the flow state is stored in a flow collection data structure having a predefined maximum quantity of ongoing flows that can be managed, wherein the plurality of ongoing flows comprises connection-based protocol flows (e.g., transmission control protocol), and, connectionless protocol flows (e.g., User Data Protocol), each connectionless protocol flow having an associated time-to-live; when it is determined that the flow collection data structure is managing a threshold quantity of connectionless protocol flows, at a particular frequency: evaluating only some of the connectionless protocol flows; and expiring flow state for one or more connectionless protocol flows having an unexpired time-to-live (e.g., idle and/or old connectionless protocol flows sooner than the actual time-to-live).

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Various technologies pertaining to network flow state management for connectionless protocol(s) are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

The subject disclosure supports various products and processes that perform, or are configured to perform, various actions regarding network flow state management for connectionless protocol(s). What follows are one or more exemplary systems and methods.

Aspects of the subject disclosure pertain to the technical problem of network flow state management for connectionless protocol(s). The technical features associated with addressing this problem involve managing flow state for each of a plurality of ongoing flows between one or more client devices and a virtual machine, wherein information regarding the flow state is stored in a flow collection data structure having a predefined maximum quantity of ongoing flows that can be managed, wherein the plurality of ongoing flows comprises connection-based protocol flows, and, connectionless protocol flows, each connectionless protocol flow having an associated time-to-live; and when it is determined that the flow collection data structure is managing greater than a threshold quantity (e.g., beyond an acceptable threshold) of connectionless protocol flows, at a dynamically adjustable frequency, expiring flow state for one or more connectionless protocol flows having an unexpired time-to-live (e.g., idle and/or old connectionless protocol flows sooner than the actual time-to-live). Accordingly, aspects of these technical features exhibit technical effects of more efficiently and effectively managing network flow state for connectionless protocol(s), for example, reducing wasted material and/or waste fabrication time.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system," as well as various forms thereof (e.g., components, systems, sub-systems, etc.) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers. Further, as used herein, the term "exemplary" is intended to mean serving as an illustration or example of something, and is not intended to indicate a preference.

Cloud-based networks allow computer processing and storing needs to be moved from on premises networks to hybrid cloud or fully cloud-based networks while satisfying data security access requirements. A virtual filtering platform (VFP) is responsible for applying network policy(ies) on network packet(s) coming in/out of virtual machine(s) (VMs). In order to apply these network policy(ies), the VFP maintains connection states regarding individual flows in a flow data structure (e.g., flow table) having a maximum quantity of flows which can be managed (e.g., 512K). A flow is created by the VFP as a by-product of evaluating network policy(ies) on receiving an initial network packet in/out of a virtual machine.

Many of these flows have a connection protocol (e.g., user data protocol (UDP)) and have short-lived and no longer needed (e.g., domain name system (DNS) query(ies)). The computing overhead associated with maintaining these flow(s) which are no longer needed can be substantial. Additionally, when the flow data structure has reached the maximum quantity of flows that can be managed, data packets on any additional connection (e.g., new flow(s)) would be dropped, resulting in performance degradation.

Described herein is a system and method for identifying and transitioning (e.g., deleting) flow(s) having a connectionless protocol when a threshold quantity of connectionless protocol flows has been reached or exceeded. Rather than maintaining a flow state for a predefined static period of time (time-to-live), for example, four minutes, the time-to-live for one or more flows can be decreased. In some embodiments, the decrease can be based, at least in part, upon a quantity of connectionless protocols flows currently being maintained. In some embodiments, flow state is expired for one or more connectionless protocol flows having an unexpired time-to-live (e.g., actual time-to-live).

In some embodiments, the flow collection data structure is locked when flow management is being performed which degrade system performance as packets cannot be processed using the locked data flow data structure. In order to minimize impact of flow management, periodically, only a portion of the data flow data structure can be reviewed (e.g., a specified number of flows (10K) and/or a specific quantity of time utilized for processing of entries in the data flow data structure). During each subsequent interval, a following portion of the data flow data structure can be reviewed until the entirety of the data flow data structure has been reviewed, with the process repeating, as necessary (e.g., while connectionless protocol flows exceed the minimum threshold). In some embodiments, a frequency with which the flow management process is performed is dynamically adjusted to adapt to system state.

Figure 1:
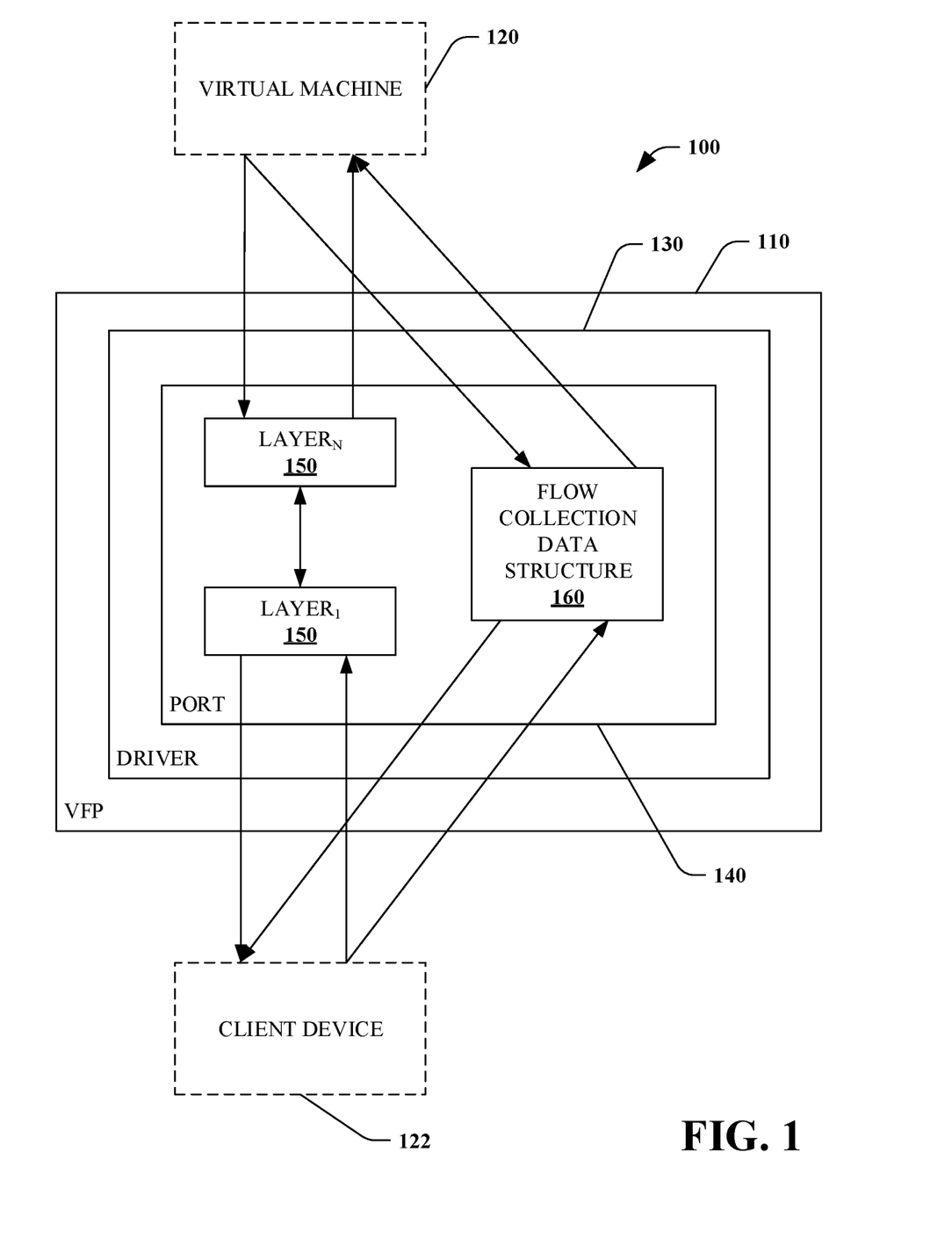
FIG. 1 is a functional block diagram that illustrates a system for managing network flow state.

Referring to FIG. 1, a system for managing network flow state 100 is illustrated. The system 100 includes a virtual filtering platform 110 that applies network policy(ies) on network packet(s) originating from or destined to a particular virtual machine(s) 120 (to or from a client device 122). The virtual filtering platform 110 can include a driver 130 having port(s) 140, for example, each port 140 can correspond to a particular virtual machine 120. In some embodiments, the virtual filtering platform 110 can comprises a plurality of drivers 130 managing network policies a plurality of virtual machines 120.

The port 140 can include one or more layers 150 that applying rule(s) and/or policy(ies) to packets to and/or from the virtual machine(s) 120. Since the network policies to be applied to flows can be extensive, the port 140 can apply the policies to an initial packet and maintain a flow collection data structure 160 (e.g., unified flow table, hash table, list, tree, etc.) which is used to track subsequent packets of particular flows. In this manner expediate subsequent packet handling of a particular flow can be expediated, since once the layers 150 have been applied to an initial packet, action(s) to be taken with respect to subsequent packets of the particular flow can be cached in the flow collection data structure 160 (e.g., unified flow hash table). This allows the subsequent packets to be processed by bypassing the layers 150 and applying information cached in the flow collection data structure 160 (e.g., unified flow table). In some embodiments, the flow collection data structure 160 is a hash table providing fast lookup based upon packet headers.

In some embodiments, due to resource limitations (e.g., processing resource(s) and/or memory), the flow collection data structure 160 can have a maximum number of flows that it can maintain for each virtual machine 120 (e.g., 512K), and, a predefined (e.g., user programmable) time-to-live (TTL) for the flows (e.g., programmable from 4 minutes to 30 minutes). Periodically, the TTL is decreased (e.g., decremented) until the TTL drops to zero, at which time the associated flow(s) are deleted from the flow collection data structure 160.

The flow collection data structure 160 does not generally reach the maximum number of flows for connection-based protocol(s) such as transmission control protocol (TCP) which exchanges control packets initiating and ending a particular session (flow). However, for connectionless protocols such as Internet Control Message Protocol (ICMP) and User Data Protocol (UDP), flows associated with connections that are no longer being used can remain in the flow collection data structure 160 until the TTL for the flow has expired. Maintaining entries in the flow collection data structure 160 for connections no longer being used can cause problems for the virtual machine 120 such as latency issues, dropped packets, and/or non-responsive connections.

In some embodiments, the VFP 110 and/or the driver 130 performs flow management by for an ICMP flow created on the VFP 110, the associated entry in the flow collection data structure 160 will be cleared when an ICMP response is process by the VFP 110.

In some embodiments, for connectionless protocol flows (e.g., UDP), once the flow collection data structure 160 exceeds a minimum flow table utilization threshold (minimum threshold), the VFP 110 dynamically adjusts the TTL for the flows in the flow collection data structure 160, for example, as set forth in Table 1:

TABLE 1 newTTL = (((CurrentFlowTTL) * (MaxFlowTableUtilizationThreshold − utilization)) / (MaxFlowTableUtilizationThreshold − MinFlowTableUtilizationThreshold))
where:
  newTTL = new time-to-live
CurrentFlowTTL = current time-to-live
utilization = ((NumEntries * 100) / FlowTableLimit)
NumEntries = Number of entries in Flowtable (e.g., the flow collection data structure 160)
FlowTableLimit = Flow table (e.g., the flow state data structure 160) size limit.
MaxFlowTableUtilizationThreshold = Maximum Flow Table (e.g., the flow collection data structure 160) Utilization Threshold
MinFlowTableUtilizationThreshold = Minimum Flow Table (e.g., the flow collection data structure 160) Utilization Threshold Decreasing the TTL entry(ies) can cause flow(s) to be expired sooner than their respective actual time-to-live. While the number of flows in the flow collection data structure 160 exceeds the minimum flow table utilization threshold, this adjustment of the TTL can be performed iteratively in order to respond to real-time conditions of the VM 120.

When the flow scale is higher, the VFP 110 can spend 100s of milliseconds enumerating through the flow collection data structure 160. This can add unacceptable latency on the packets sent to/from VMs 120.

In some embodiments, the VFP 110 periodically reviews and decreases the TTL for only a portion of entries in the flow collection data structure 160 (e.g., partial enumeration of entries). In some embodiments, a quantity of entries reviewed during a specification time interval is predefined (e.g., 10K flows). In some embodiments, the quantity of entries reviewed is based up a predefined or dynamically adjustable period of time.

When enumerating through entries of the flow collection data structure 160 and decreasing the TTL, the driver 130 utilizes processing resources and blocks packets from utilizing the flow collection data structure 160 (since the flow collection data structure 160 is locked when it is being updated). In order minimize the impact of flow collection data structure 160 updates, the driver 130 only enumerates the flow collection data structure 160 partially (e.g., a specified number of flows (10K) and/or a specific quantity of time is utilized for processing of entries).

In some embodiments, the driver 130 can utilize a mechanism to enumerate the flow collection data structure 160 partially. A state of the enumerator can be saved to resume at the same point in the flow collection data structure 160. For example, the state at which the enumeration stops can be based on one or both of two configurable parameters: number of flows; and/or run duration (e.g., in milliseconds). In some embodiments, when a number of flows is configured, the driver 130 can enumerate through the configured number of flows, save the enumeration state, release the lock on flow collection data structure 160 and come back later to resume enumeration from same state. In some embodiments, when a run duration is configured, the driver 130 enumerates entries in the flow collection data structure 160 for a time duration (e.g., derived by the equation set forth in Table 2 below), releases the lock on the flow collection data structure 160, and comes back later to resume enumeration where it left off:

TABLE 2

WorkerRoutineRunDuration = [LatencyFactor] * (TotalFlow/FlowTableLimit) * FlowsNearingExpiry
where:
  LatencyFactor = A multiplier based on a performance requirement.
  FlowsNearingExpiry = Flows with TTL less than predefined period of time (e.g., 30 milliseconds)

The performance requirement can be a predefined multiplier proportional to an amount of time allocated for flow management. In some embodiments, the VFP 110 utilizes an adaptive approach for flow management in network driver(s) 130. The VFP 110 uses a port timer to schedule a work item to update state of the port 130. In some embodiments, the adaptive approach can be utilized with the partial enumeration discussed above. In some embodiments, the VFP 110 can schedule a work item at a frequency which results in optimal port timer performance.

In some embodiments, the VFP 110 periodically reviews and decreases the TTL entries in the flow collection data structure 160 at a dynamically adjustable frequency in order to adapt to system state. In some embodiments, the dynamically adjustable frequency can be determined as set forth in Table 3:

TABLE 3 newFreq = (1 − TotalFlow/FlowTableLimit) * (1 − ConCreateRate) * (ConDelRate) * (Interval);
where:
  newFreq = Time after which the work item is scheduled again
  ConCreateRate = Rate at which new connections/flows are created
  ConDelRate = Rate at which flows are deleted
  Interval = Standard port timer run duration The frequency of the port timer run can thus be dynamic, and can adapt to the system state. Thus, if the rate of flow creation is high, the port timer can be adapted to run at lower frequency in order to unblock the flow collection data structure 160 to insert entries into it. If the rate of deletion is higher, the port timer can be allowed to run at a higher frequency. This allows more flows to be expired (e.g., deleted) and in turn free up space in the flow collection data structure 160.

Figure 2:
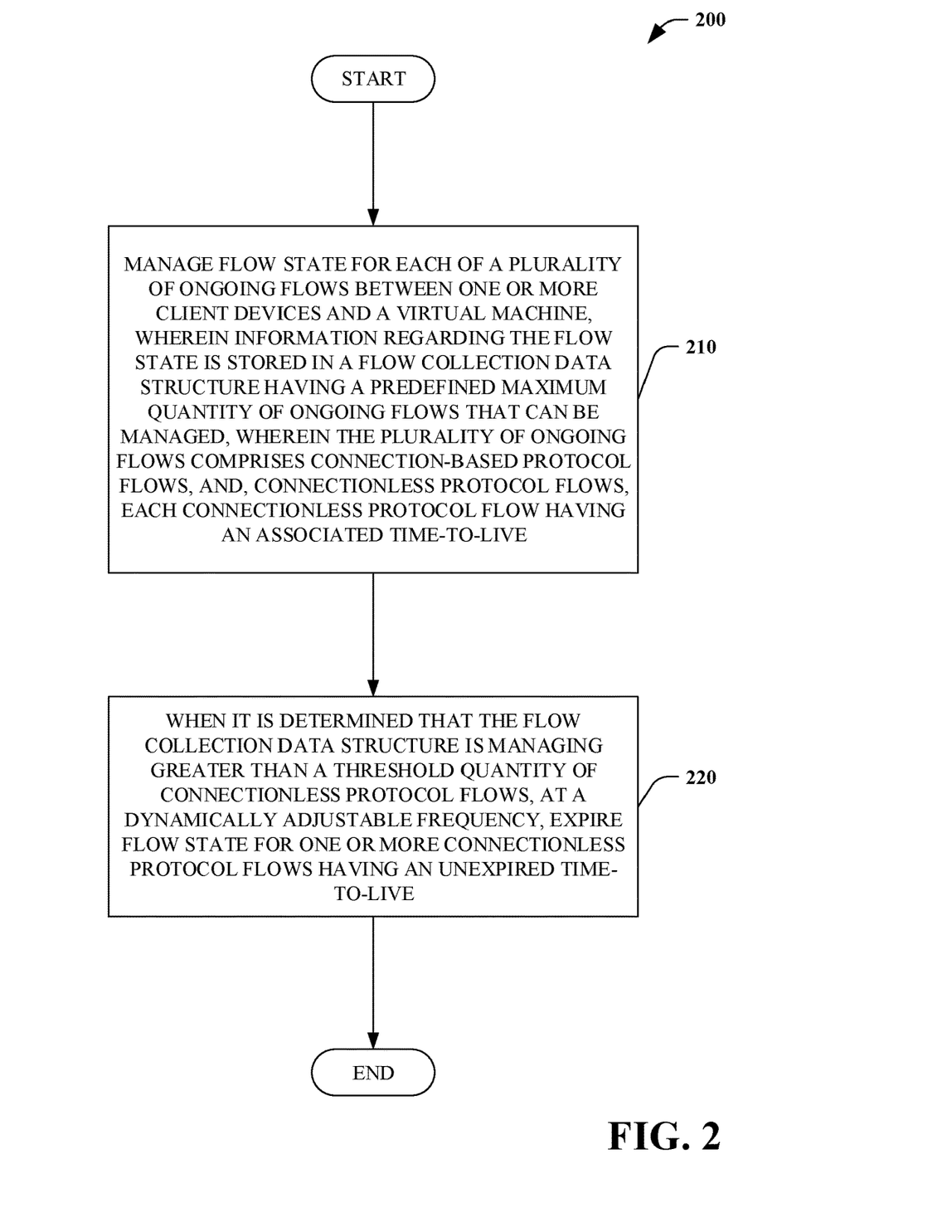
FIG. 2 is a flow chart of a method of performing network flow management.
Figure 3:
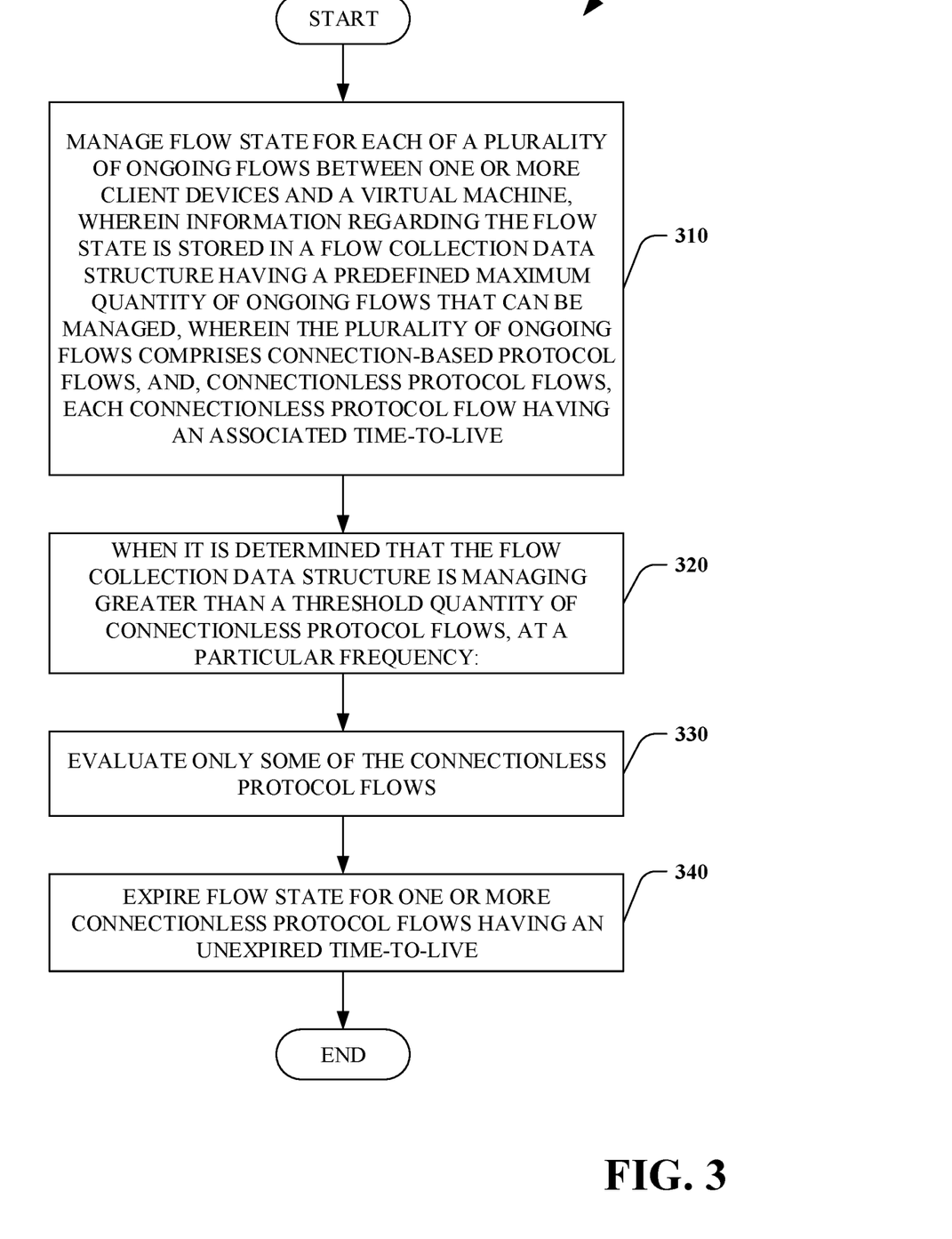
FIG. 3 is a flow chart of a method of performing network flow management.
Figure 4:
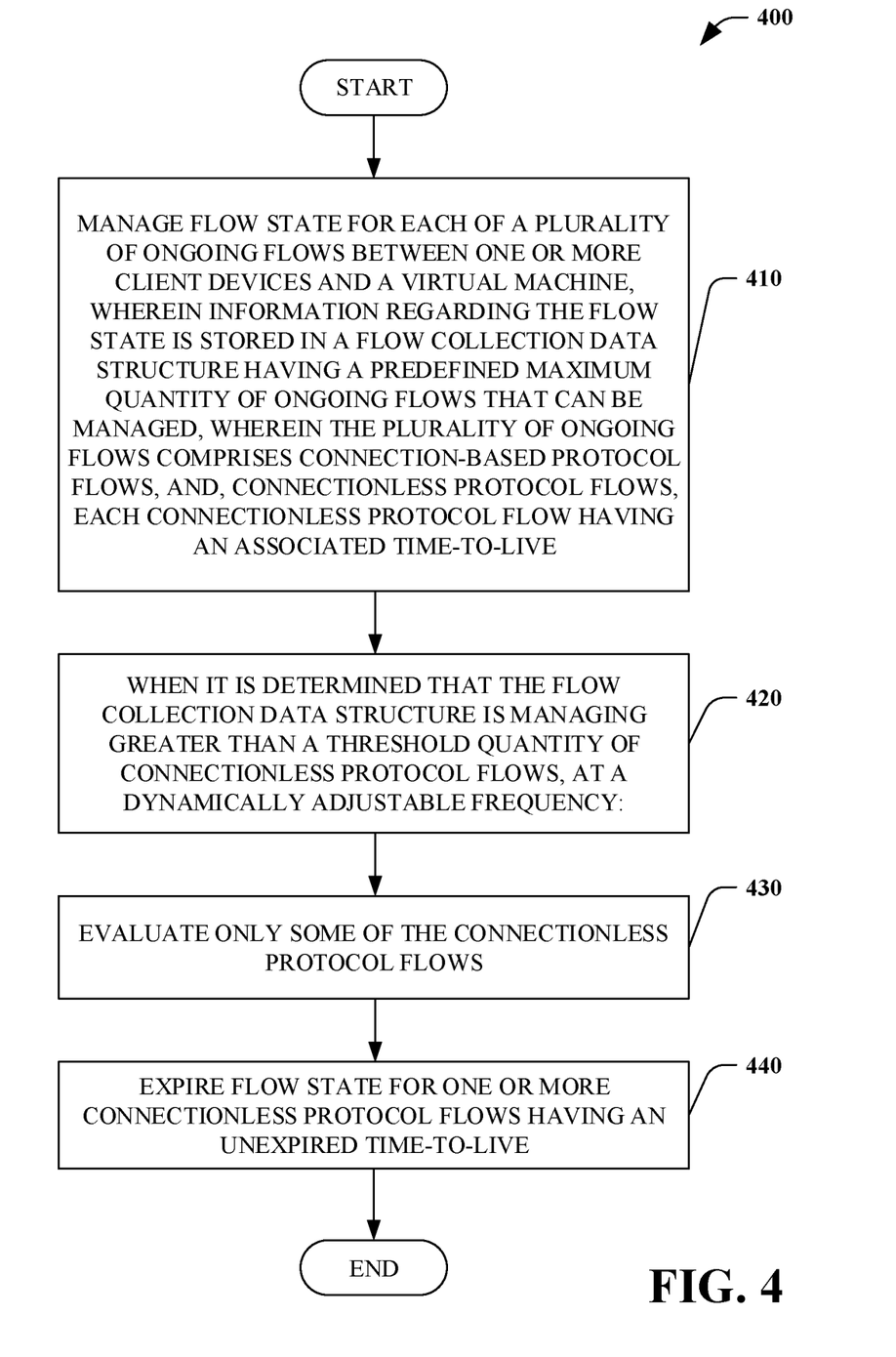
FIG. 4 is a flow chart of a method of performing network flow management.

FIGS. 2-4 illustrate exemplary methodologies relating to network flow management. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring to FIG. 2, a method of performing network flow management 200 is illustrated. In some embodiments, the method 200 is performed by the system 100.

At 210, flow state for each of a plurality of ongoing flows between one or more client devices and a virtual machine is managed. Information regarding the flow state is stored in a flow collection data structure having a predefined maximum quantity of ongoing flows that can be managed. The plurality of ongoing flows comprises a plurality of connection-based protocol flows, and, a plurality of connectionless protocol flows. Each connectionless protocol flow has an associated time-to-live; and At 220, when it is determined that the flow collection data structure is managing greater than a threshold quantity of connectionless protocol flows (e.g., beyond an acceptable threshold of connectionless protocol flows), at a dynamically adjustable frequency, flow state for one or more connectionless protocol flows having an expired time-to-live are deleted (e.g., removed from a flow collection data structure.

Turning to FIG. 3, a method of performing network flow management 300 is illustrated. In some embodiments, the method 300 is performed by the system 100.

At 310, flow state for each of a plurality of ongoing flows between one or more client devices and a virtual machine is managed. The information regarding the flow state is stored in a flow collection data structure having a predefined maximum quantity of ongoing flows that can be managed. The plurality of ongoing flows comprises connection-based protocol flows, and, connectionless protocol flows. Each connectionless protocol flow has an associated time-to-live.

At 320, when it is determined that the flow collection data structure is managing greater than a threshold quantity of connectionless protocol flows, at a particular frequency: at 330, only some of the connectionless protocol flows are evaluated (e.g., partial enumeration of entries in flow collection data structure). At 340, flow state for one or more connectionless protocol flows having an expired time-to-live is deleted.

Next, referring to FIG. 4, a method of performing network flow management 400 is illustrated. In some embodiments, the method 400 is performed by the system 100.

At 410, flow state for each of a plurality of ongoing flows between one or more client devices and a virtual machine is managed. The information regarding the flow state is stored in a flow collection data structure having a predefined maximum quantity of ongoing flows that can be managed. The plurality of ongoing flows comprises connection-based protocol flows, and, connectionless protocol flows. Each connectionless protocol flow has an associated time-to-live.

At 420, when it is determined that the flow collection data structure is managing a greater than a threshold quantity of connectionless protocol flows, at a dynamically adjustable frequency: at 430, only some of the connectionless protocol flows are evaluated. At 440, flow state for one or more connectionless protocol flows having an expired time-to-live is deleted.

Described herein is a system for managing network flow state, comprising: a computer comprising a processor and a memory having computer-executable instructions stored thereupon which, when executed by the processor, cause the computer to: manage flow state for each of a plurality of ongoing flows between one or more client devices and a virtual machine, wherein information regarding the flow state is stored in a flow collection data structure having a predefined maximum quantity of ongoing flows that can be managed, wherein the plurality of ongoing flows comprises connection-based protocol flows, and, connectionless protocol flows, each connectionless protocol flow having an associated time-to-live; and when it is determined that the flow collection data structure is managing greater than a threshold of connectionless protocol flows, at a dynamically adjustable frequency, expire flow state for one or more connectionless protocol flows having an unexpired time-to-live.

The system can further include wherein dynamically adjustable frequency is adjusted based, at least in part, upon a rate at which new flows are being created. The system of can further include wherein dynamically adjustable frequency is adjusted based, at least in part, upon a rate at which flows are being deleted. The system can include the memory having further computer-executable instructions stored thereupon which, when executed by the processor, cause the computer to: adjust the time-to-live associated with for one or more connectionless protocol flows.

The system can further include wherein adjusting the time-to-live is based, at least in part, upon a percentage of utilization of the maximum quantity of ongoing flows of the flow collection data structure. The system can further include wherein the connectionless protocol comprises a user data protocol. The system can further include wherein the flow collection data structure comprises a hash table indexed based upon a hash function of a packet header. The system can further include wherein the information regarding the flow state stored in the flow collection data structure comprises an action to be taken regarding a packet associated with a particular flow of the plurality of ongoing flows.

Described herein is a method of performing network flow management, comprising: managing flow state for each of a plurality of ongoing flows between one or more client devices and a virtual machine, wherein information regarding the flow state is stored in a flow collection data structure having a predefined maximum quantity of ongoing flows that can be managed, wherein the plurality of ongoing flows comprises connection-based protocol flows, and, connectionless protocol flows, each connectionless protocol flow having an associated time-to-live; when it is determined that the flow collection data structure is managing greater than a threshold quantity of connectionless protocol flows, at a particular frequency: evaluating only some of the connectionless protocol flows; and expiring flow state for one or more connectionless protocol flows have an unexpired time-to-live.

The method can further include wherein a quantity of connectionless protocol flows evaluated is predefined. The method can further include wherein a quantity of connectionless protocol flows evaluated is based upon a predefined period of time to perform the evaluation. The method can further include further comprising: adjusting the time-to-live associated with one or more connectionless protocol flow.

The method can further include wherein the time-to-live is based, at least in part, upon a percentage of utilization of the maximum quantity of ongoing flows of the flow collection data structure. The method can further include wherein the connectionless protocol comprises a user data protocol. The method can further include wherein the flow collection data structure comprises a hash table indexed based upon a hash function of a packet header.

Described herein is a computer storage media storing computer-readable instructions that when executed cause a computing device to: manage flow state for each of a plurality of ongoing flows between one or more client devices and a virtual machine, wherein information regarding the flow state is stored in a flow collection data structure having a predefined maximum quantity of ongoing flows that can be managed, wherein the plurality of ongoing flows comprises connection-based protocol flows, and, connectionless protocol flows, each connectionless protocol flow having an associated time-to-live; when it is determined that the flow collection data structure is managing a threshold quantity of connectionless protocol flows, at a dynamically adjustable frequency: evaluate only some of the connectionless protocol flows; and expire flow state for one or more connectionless protocol flows having an unexpired time-to-live.

The computer storage media can store further computer-readable instructions that when executed cause a computing device to: when it is determined that the flow collection data structure is managing the threshold quantity of connectionless protocol flows, at the dynamically adjustable frequency: adjust a time-to-live for one or more connectionless protocol flows.

The computer storage media can further include wherein adjusting the time-to-live is based, at least in part, upon a percentage of utilization of the maximum quantity of ongoing flows of the flow collection data structure. The computer storage media can further include wherein dynamically adjustable frequency is adjusted based, at least in part, upon a rate at which new flows are being created. The computer storage media can further include wherein dynamically adjustable frequency is adjusted based, at least in part, upon a rate at which flows are being deleted.

Figure 5:
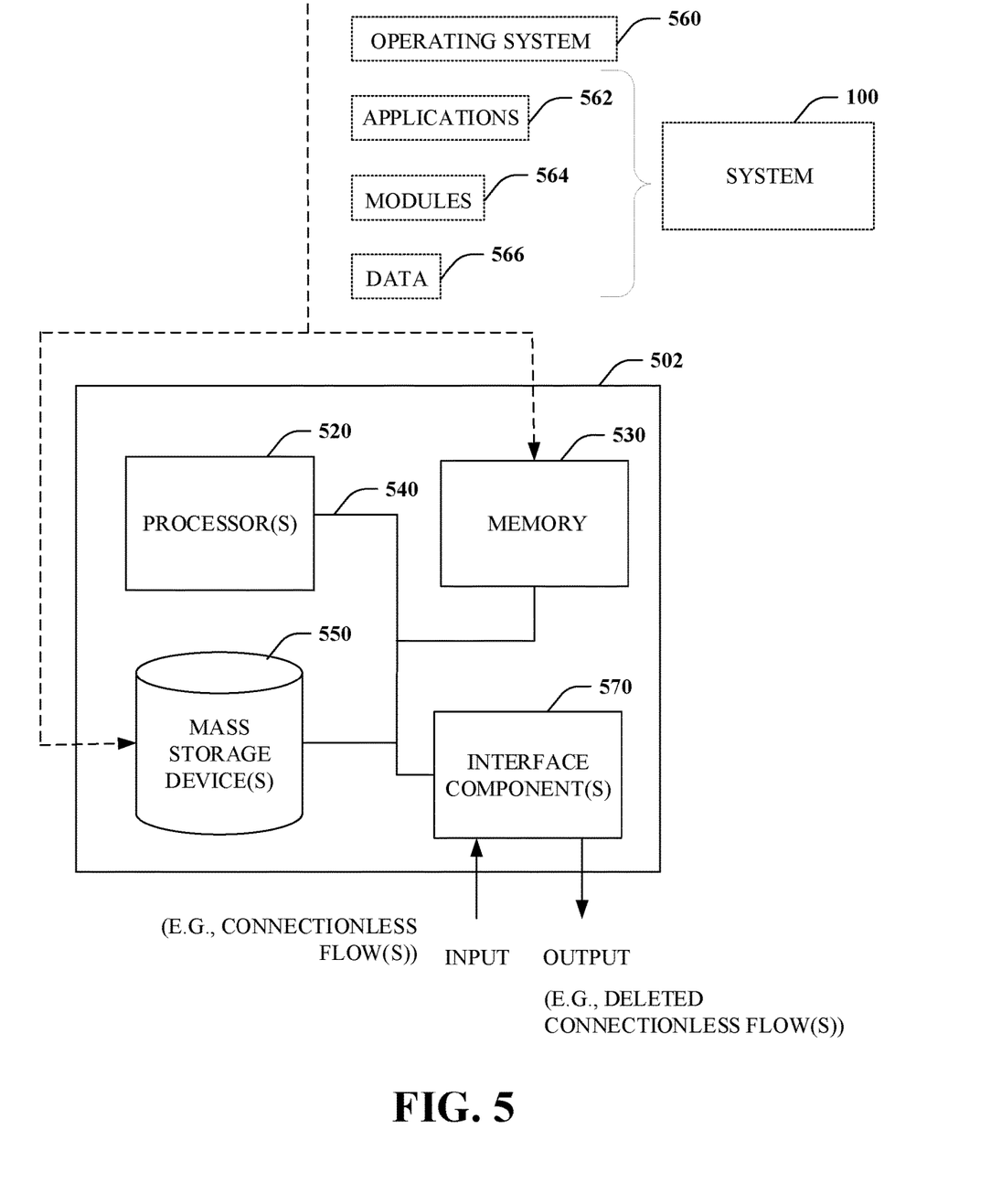
FIG. 5 is a functional block diagram that illustrates an exemplary computing system.

With reference to FIG. 5, illustrated is an example general-purpose computer or computing device 502 (e.g., mobile phone, desktop, laptop, tablet, watch, server, handheld, programmable consumer or industrial electronics, set-top box, game system, compute node, etc.). For instance, the computing device 502 may be used in a system for managing network flow state 100.

The computer 502 includes one or more processor(s) 520, memory 530, system bus 540, mass storage device(s) 550, and one or more interface components 570. The system bus 540 communicatively couples at least the above system constituents. However, it is to be appreciated that in its simplest form the computer 502 can include one or more processors 520 coupled to memory 530 that execute various computer executable actions, instructions, and or components stored in memory 530. The instructions may be, for instance, instructions for implementing functionality described as being carried out by one or more components discussed above or instructions for implementing one or more of the methods described above.

The processor(s) 520 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 520 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 520 can be a graphics processor.

The computer 502 can include or otherwise interact with a variety of computer-readable media to facilitate control of the computer 502 to implement one or more aspects of the claimed subject matter. The computer-readable media can be any available media that can be accessed by the computer 502 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM), etc.), magnetic storage devices (e.g., hard disk, floppy disk, cassettes, tape, etc.), optical disks (e.g., compact disk (CD), digital versatile disk (DVD), etc.), and solid state devices (e.g., solid state drive (SSD), flash memory drive (e.g., card, stick, key drive) etc.), or any other like mediums that store, as opposed to transmit or communicate, the desired information accessible by the computer 502. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 530 and mass storage device(s) 550 are examples of computer-readable storage media. Depending on the exact configuration and type of computing device, memory 530 may be volatile (e.g., RAM), non-volatile (e.g., ROM, flash memory, etc.) or some combination of the two. By way of example, the basic input/output system (BIOS), including basic routines to transfer information between elements within the computer 502, such as during start-up, can be stored in nonvolatile memory, while volatile memory can act as external cache memory to facilitate processing by the processor(s) 520, among other things.

Mass storage device(s) 550 includes removable/non-removable, volatile/non-volatile computer storage media for storage of large amounts of data relative to the memory 530. For example, mass storage device(s) 550 includes, but is not limited to, one or more devices such as a magnetic or optical disk drive, floppy disk drive, flash memory, solid-state drive, or memory stick.

Memory 530 and mass storage device(s) 550 can include, or have stored therein, operating system 560, one or more applications 562, one or more program modules 564, and data 566. The operating system 560 acts to control and allocate resources of the computer 502. Applications 562 include one or both of system and application software and can exploit management of resources by the operating system 560 through program modules 564 and data 566 stored in memory 530 and/or mass storage device (s) 550 to perform one or more actions. Accordingly, applications 562 can turn a general-purpose computer 502 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, system 100 or portions thereof, can be, or form part, of an application 562, and include one or more modules 564 and data 566 stored in memory and/or mass storage device(s) 550 whose functionality can be realized when executed by one or more processor(s) 520.

In some embodiments, the processor(s) 520 can correspond to a system on a chip (SOC) or like architecture including, or in other words integrating, both hardware and software on a single integrated circuit substrate. Here, the processor(s) 520 can include one or more processors as well as memory at least similar to processor(s) 520 and memory 530, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the system 100 and/or associated functionality can be embedded within hardware in a SOC architecture.

The computer 502 also includes one or more interface components 570 that are communicatively coupled to the system bus 540 and facilitate interaction with the computer 502. By way of example, the interface component 570 can be a port (e.g., serial, parallel, PCMCIA, USB, FireWire, etc.) or an interface card (e.g., sound, video, etc.) or the like. In one example implementation, the interface component 570 can be embodied as a user input/output interface to enable a user to enter commands and information into the computer 502, for instance by way of one or more gestures or voice input, through one or more input devices (e.g., pointing device such as a mouse, trackball, stylus, touch pad, keyboard, microphone, joystick, game pad, satellite dish, scanner, camera, other computer, etc.). In another example implementation, the interface component 570 can be embodied as an output peripheral interface to supply output to displays (e.g., LCD, LED, plasma, etc.), speakers, printers, and/or other computers, among other things. Still further yet, the interface component 570 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system for managing network flow state, comprising:
a processor and a memory having computer-executable instructions stored thereupon which, when executed by the processor, cause the system to:
store, in a flow collection data structure, information regarding flow states for a plurality of flows between one or more client devices and a virtual machine, wherein the flow collection data structure has a predefined maximum quantity of flows that can be managed, each flow comprising a plurality of data packets originating from or destined to a particular virtual machine, and each flow associated with a flow state for managing data packets associated with the flow, wherein the plurality of ongoing flows comprises connection-based protocol flows and connectionless protocol flows, each connectionless protocol flow having an associated time-to-live indicative of a period of time after which a corresponding connectionless protocol flow is expired;
determine that the flow collection data structure is managing greater than a threshold quantity of connectionless protocol flows;
in response to the determination, decrease a time-to-live value for one or more connectionless protocol flows having an unexpired time-to-live, thereby increasing a rate at which flow states for the connectionless protocol flows are deleted from the flow collection data structure; and
iteratively adjust the time-to-live values for the connectionless protocol flows in response to real-time conditions of the virtual machine.

2. The system of claim 1, wherein the time-to-live value is decreased at a dynamically adjustable frequency that is adjusted based, at least in part, upon a rate at which new flows are being created.

3. The system of claim 2, wherein the dynamically adjustable frequency is adjusted based, at least in part, upon a rate at which flows are being deleted.

4. The system of claim 1, wherein decreasing the time-to-live causes an early expiration of a flow state for the one or more connectionless protocol flows.

5. The system of claim 1, wherein decreasing the time-to-live is based, at least in part, upon a percentage of utilization of the maximum quantity of ongoing flows of the flow collection data structure.

6. The system of claim 1, wherein the connectionless protocol comprises UDP.

7. The system of claim 1, wherein the flow collection data structure comprises a hash table indexed based upon a hash function of a packet header.

8. The system of claim 1, wherein the information regarding the flow states stored in the flow collection data structure comprises an action to be taken regarding a packet associated with a particular flow of the plurality of flows.

9. A method of performing network flow management, comprising:
- storing, in a flow collection data structure, information regarding flow states for a plurality of flows between one or more client devices and a virtual machine, wherein the flow collection data structure has a predefined maximum quantity of flows that can be managed, each flow comprising a plurality of data packets, and each flow associated with a flow state for data packets associated with the flow, wherein the plurality of ongoing flows comprises connection-based protocol flows and connectionless protocol flows, each connectionless protocol flow having an associated time-to-live indicative of a period of time after which a corresponding connectionless protocol flow is expired;
- determining that the flow collection data structure is managing greater than a threshold quantity of connectionless protocol flows;
- in response to the determination, at a predetermined frequency:
- evaluating only some of the connectionless protocol flows;
- decreasing a time-to-live value for one or more connectionless protocol flows having an unexpired time-to-live, thereby increasing a rate at which flow states for the connectionless protocol flows are deleted from the flow collection data structure; and
- iteratively adjusting the time-to-live value while a minimum flow table utilization threshold is exceeded.

10. The method of claim 9, wherein a quantity of the evaluated connectionless protocol flows is predefined.

11. The method of claim 9, wherein a quantity of the evaluated connectionless protocol flows is based upon a predefined period of time to perform the evaluation.

12. The method of claim 9, wherein decreasing the time-to-live causes an early expiration of a flow state for the one or more connectionless protocol flows.

13. The method of claim 9, wherein decreasing the time-to-live is based, at least in part, upon a percentage of utilization of the maximum quantity of ongoing flows of the flow collection data structure.

14. The method of claim 9, wherein the connectionless protocol comprises UDP.

15. The method of claim 9, wherein the flow collection data structure comprises a hash table indexed based upon a hash function of a packet header.

16. A computer storage media storing computer-readable instructions that when executed cause a computing device to:
- store, in a flow collection data structure, information regarding flow states for a plurality of flows between one or more client devices and a virtual machine, wherein the flow collection data structure has a predefined maximum quantity of flows that can be managed, each flow comprising a plurality of data packets, and each flow associated with a flow state for data packets associated with the flow, wherein the plurality of ongoing flows comprises connection-based protocol flows and connectionless protocol flows, each connectionless protocol flow having an associated time-to-live indicative of a period of time after which a corresponding connectionless protocol flow is expired;
- determine that the flow collection data structure is managing a threshold quantity of connectionless protocol flows:
- in response to the determination, at a dynamically adjustable frequency:
- evaluate a portion of the connectionless protocol flows; and
- decrease a time-to-live value for one or more connectionless protocol flows having an unexpired time-to-live, thereby increasing a rate at which flow states for the connectionless protocol flows are deleted from the flow collection data structure.

17. The computer storage media of claim 16, wherein adjusting the time-to-live causes an early expiration of a flow state for the one or more connectionless protocol flows.

18. The computer storage media of claim 16, wherein the dynamically adjustable frequency is based, at least in part, upon a percentage of utilization of the maximum quantity of ongoing flows of the flow collection data structure.

19. The computer storage media of claim 16, wherein the dynamically adjustable frequency is adjusted based, at least in part, upon a rate at which new flows are being created.

20. The computer storage media of claim 16, wherein the dynamically adjustable frequency is adjusted based, at least in part, upon a rate at which flows are being deleted.

* * * * *